(12) United States Patent
Badreddine et al.

(10) Patent No.: US 9,469,200 B2
(45) Date of Patent: Oct. 18, 2016

(54) AUTOMOTIVE VEHICLE AND METHOD OF DETERMINING FORWARD OR BACKWARD MOVEMENT OF SAME

(75) Inventors: Bader M. Badreddine, Dearborn, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1446 days.

(21) Appl. No.: 12/577,911

(22) Filed: Oct. 13, 2009

(65) Prior Publication Data

US 2011/0083917 A1    Apr. 14, 2011

(51) Int. Cl.
*B60K 6/448*      (2007.10)
*B60L 11/12*     (2006.01)
*B60K 6/52*       (2007.10)
*B60L 11/14*     (2006.01)
*B60L 15/20*     (2006.01)
*B60W 40/10*    (2012.01)

(52) U.S. Cl.
CPC .............. *B60L 11/123* (2013.01); *B60K 6/448* (2013.01); *B60K 6/52* (2013.01); *B60L 11/14* (2013.01); *B60L 15/20* (2013.01); *B60W 40/10* (2013.01); *B60L 2260/28* (2013.01); *B60W 2520/10* (2013.01); *Y02T 10/6217* (2013.01); *Y02T 10/6243* (2013.01); *Y02T 10/6265* (2013.01); *Y02T 10/645* (2013.01); *Y02T 10/7077* (2013.01); *Y02T 10/72* (2013.01); *Y02T 10/7275* (2013.01)

(58) Field of Classification Search
USPC .................. 180/65.1, 65.21, 65.225, 65.265, 180/65.275, 65.285, 65.6; 318/430–434, 318/400.15, 400.23, 400.14, 400.721, 437, 318/779, 799, 257, 266, 268, 256, 280–282
See application file for complete search history.

(56) References Cited

U.S. PATENT DOCUMENTS

| | | | |
|---|---|---|---|
| 5,289,890 A | 3/1994 | Toyoda et al. | |
| 5,376,869 A | 12/1994 | Konrad | |
| 5,451,851 A | 9/1995 | Allen et al. | |
| 5,568,024 A | 10/1996 | Suzuki | |
| 6,953,415 B2 | 10/2005 | Kadota | |
| 6,984,949 B2 | 1/2006 | Sarraillon et al. | |
| 7,425,808 B2 * | 9/2008 | Kamiya | 318/376 |
| 7,448,458 B2 * | 11/2008 | Meyer | 180/65.31 |
| 8,020,652 B2 * | 9/2011 | Bryan et al. | 180/65.285 |
| 2001/0020789 A1 * | 9/2001 | Nakashima | 290/40 C |
| 2004/0065489 A1 * | 4/2004 | Aberle et al. | 180/65.1 |

FOREIGN PATENT DOCUMENTS

WO    0066916 A1    11/2000

* cited by examiner

*Primary Examiner* — John Walters
*Assistant Examiner* — Brian Swenson
(74) *Attorney, Agent, or Firm* — David B. Kelley; Brooks Kushman P.C.

(57) ABSTRACT

An automotive vehicle may include an electric machine and a controller. The electric machine may be configured to provide and receive mechanical torque. The controller may be configured to determine forward or backward movement of the vehicle based on the provided or received mechanical torque and a mechanical power of the electric machine.

11 Claims, 2 Drawing Sheets

AUTOMOTIVE VEHICLE AND METHOD OF DETERMINING FORWARD OR BACKWARD MOVEMENT OF SAME

BACKGROUND

International Publication Number WO 00/66916 discloses a method for detecting forward and/or rearward driving of a motor vehicle by evaluating rpm signals. A signal representing the rpm of an input shaft pertaining to the transmission is compared to a signal representing the rpm of an output shaft pertaining to the transmission. Forward driving or rearward driving is concluded from this comparison.

U.S. Pat. No. 5,568,024 to Suzuki discloses two motor sensors that are disposed at two different angular positions of a motor to generate two pulse signals of different phase. The motor rotational speed and direction can be detected on the basis of these pulse signals. The detected motor rotational direction is checked to determine whether it is the same or opposite to that indicated by a shift lever. If opposite, a battery operated car is determined to be moving down a sloping road, and the motor torque is corrected so that the battery operated car can be stopped on condition that the accelerator pedal is slightly depressed. After that, when the accelerator pedal is further depressed and the accelerator pedal stroke is sufficient to generate a motor torque for starting the battery operated car on a sloping road, ordinary drive control is executed.

U.S. Pat. No. 5,376,869 to Konrad discloses an electric vehicle drivetrain that includes a controller for detecting and compensating for vehicle rollback. The vehicle includes an electric motor rotatable in either of opposite directions corresponding to the direction of vehicle movement. A gear selector permits the driver to select an intended or desired direction of vehicle movement. If a speed and rotational direction sensor associated with the motor indicates vehicle movement opposite to the intended direction of vehicle movement, the motor is driven to a torque output magnitude as a non-constant function of the rollback speed to counteract the vehicle rollback.

SUMMARY

An automotive vehicle includes a driveshaft, an electric machine, and a controller. The electric machine is configured to generate and consume electrical power, and includes a rotor connected with the driveshaft. The controller is configured to determine a direction of rotation of the rotor based on a torque command to the electric machine and the electrical power generated or consumed by the electric machine.

An automotive vehicle includes an electric machine and a controller. The electric machine is configured to provide and receive mechanical torque. The controller is configured to determine forward or backward movement of the vehicle based on the provided or received mechanical torque and a mechanical power of the electric machine.

A method for determining forward or backward movement of a vehicle includes determining a mechanical torque of an electric machine disposed within the vehicle, determining a mechanical power of the electric machine, and determining whether the vehicle is moving forward or backward based on the determined mechanical torque and determined mechanical power.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

In some alternatively powered vehicles, the vehicle's direction of travel (e.g., forward or backward) may be used to assign the appropriate sign (i.e., positive or negative) to driver wheel torque commands in order to provide proper regenerative braking. This may ensure that vehicle motion is in the direction the driver expects. Errors in assessing the vehicle's direction of travel may result in unintended vehicle movement.

A vehicle's direction of travel may be determined via more than one technique to ensure accuracy. As an example, known electric motor resolvers and directional vehicle speed sensors may be used to independently derive a vehicle's direction of travel. Directional vehicle speed sensors, however, may be costly. As explained below, information related to mechanical power and/or torque of an electric machine may be used to determine a vehicle's direction of travel.

Figure 1:
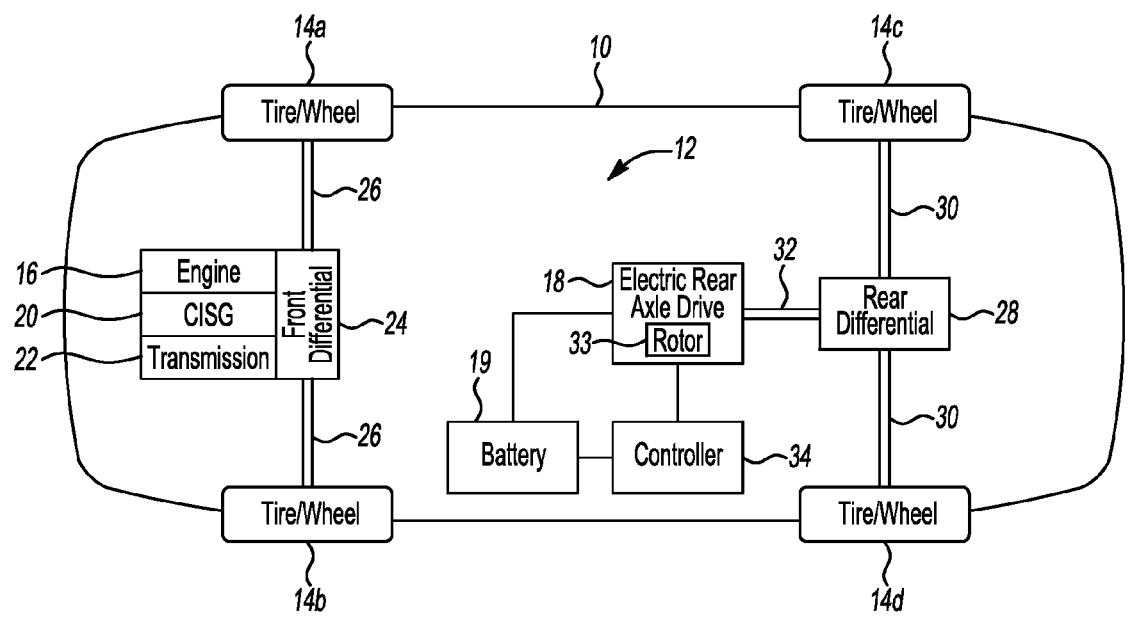
FIG. 1 is a block diagram of an example configuration of a hybrid electric vehicle.

Referring now to FIG. 1, an automotive vehicle 10 may include a drivetrain 12. The drivetrain 12 may include tire/wheel assemblies 14n (14a, 14b, 14c, 14d), an engine 16, electric machine 18 (e.g., electric rear axle drive), and power storage unit 19 (e.g., battery). The drivetrain 12 may also include a crank integrated starter/generator 20 (CISG or other electric machine), transmission 22, front differential 24, and front half shafts 26. (As apparent to those of ordinary skill, components immediately adjacent to each other are mechanically connected.) The drivetrain 12 may further include a rear differential 28, rear half shafts 30, and a rear prop shaft 32. The electric machine 18 includes a rotor 33 connected with the rear prop shaft 32. Of course, other drivetrain configurations, such as electric only, hybrid power-split, hybrid fuel cell, etc., are also possible.

As known in the art, the CISG 20 may be used to start or stop the engine 16; the engine may generate motive power to drive the tire/wheel assemblies 14a, 14b via the transmission 22, front differential 24, and front half shafts 26. As also known in the art, the electric machine 18 may act as a motor to generate motive power to drive the tire wheel assemblies 14c, 14d via the rear prop shaft 32, rear differential 28, and rear half shafts 30; the electric machine 18 may also act as a generator to generate electrical power for storage by the power storage unit 19. Either or both of the engine 16 and electric machine 18 may be used to generate motive power to drive the tire/wheel assemblies 14n.

A controller 34 (or controllers) in communication with the electric machine 18 may submit torque commands/requests to the electric machine 18 such that, for example, the electric machine 18 generates motive power to move the tire wheel assemblies 14c, 14d, or generates electrical power for storage by the power storage unit 19. The controller 34 may also determine the direction of travel of the vehicle 10 based on information related to the mechanical power and/or torque of the electric machine 18.

Because the rotor 33 is connected with the rear prop shaft 32, the rotor 33 may rotate in one direction if the vehicle 10 is moving forward, and rotate in the opposite direction if the vehicle 10 is moving backward. The velocity (speed and direction of rotation) of the rotor 33 may be given by $$RV = MP/T \qquad (1)$$

where RV is the velocity of the rotor 33, MP is the mechanical power associated with the electric machine 18, and T is the torque associated with the electric machine 18. The torque, T, may be estimated, for example, using an A/C current sensor arranged in concert with the electric machine 18 in a known fashion, or based on the torque commands/requests issued by the controller 34 to the electric machine 18. Other suitable techniques may also be used.

The mechanical power, MP, may be given by $$MP = EP - LP \qquad (2)$$

where EP is the electrical power consumed/generated by the electric machine 18, and LP is the power associated with electrical losses of the electric machine 18. The power associated with electrical losses, LP, may be estimated, for example, via a look-up table that maps various parameters, such as (i) electric machine torque, speed and temperature, and (ii) battery bus voltage, etc., with the power associated with electrical losses of the electric machine 18. As apparent to those of ordinary skill, this mapping may be generated via testing and/or simulation, and stored within the controller 34. Other suitable techniques may also be used.

The electrical power consumed/generated by the electric machine, EP, may be given by $$EP = BP - OP \qquad (3)$$

where BP is the power of the power storage unit 19, and OP is the power drawn by other electrical loads of the vehicle 10. The power of the power storage unit 19, BP, may be determined in a known fashion based on, for example, the current and voltage of the power storage unit 19. The power drawn by other electrical loads, OP, may also be determined (measured) in a known fashion.

The controller 34 may determine the velocity of the rotor 33 by way of (1), (2) and (3) every, for example, 10 milliseconds, 100 milliseconds, etc. Table 1 lists the direction of travel of vehicle 10 as a function of the sign of the mechanical power and torque associated with the electric machine 18. The sign convention is such that, if the mechanical power and torque have the same sign, the vehicle 10 is moving forward, and if the mechanical power and torque have different signs, the vehicle 10 is moving backward. If either (or both) of the mechanical power and torque is absent (i.e., 0), the vehicle 10 is assumed to be moving in the same direction as determined previously. (Because the rotor 33 is connected to the rear prop shaft 32, as mentioned above, the direction of travel of the vehicle 10 is indicative of the direction of rotation of the rotor 3, and visa-versa.)

TABLE 1

| MP | T | Vehicle Direction |
|---|---|---|
| + | + | Forward |
| − | − | Forward |
| + | − | Backward |
| − | + | Backward |
| + | 0 | Last value |
| − | 0 | Last value |
| 0 | + | Last value |
| 0 | − | Last value |
| 0 | 0 | Last value |

Testing of the above techniques was performed and compared with the conventional resolver technique. Results of the testing revealed substantial differences between the techniques, under certain circumstances, for vehicle speeds less than ±1 mile per hour. As a result, use of Table 1 by the controller 34 may be vehicle speed dependent. For example, if the speed of vehicle 10, as determined in any known fashion, is greater than ±1.5 miles per hour (other values may also be used as design and testing considerations dictate), the controller 34 may determine the direction of travel of the vehicle 10 via (1), (2) and (3), and/or Table 1. If the speed of the vehicle 10 is less than or equal to ±1.5 miles per hour, the controller 34 may determine the direction of travel of the vehicle 10 via a PRND position. That is, if the vehicle 10 is in "Drive," the controller determines the vehicle 10 to be moving forward. If the vehicle 10 is in "Reverse," the controller determines the vehicle 10 to be moving backward, etc.

Figure 2:
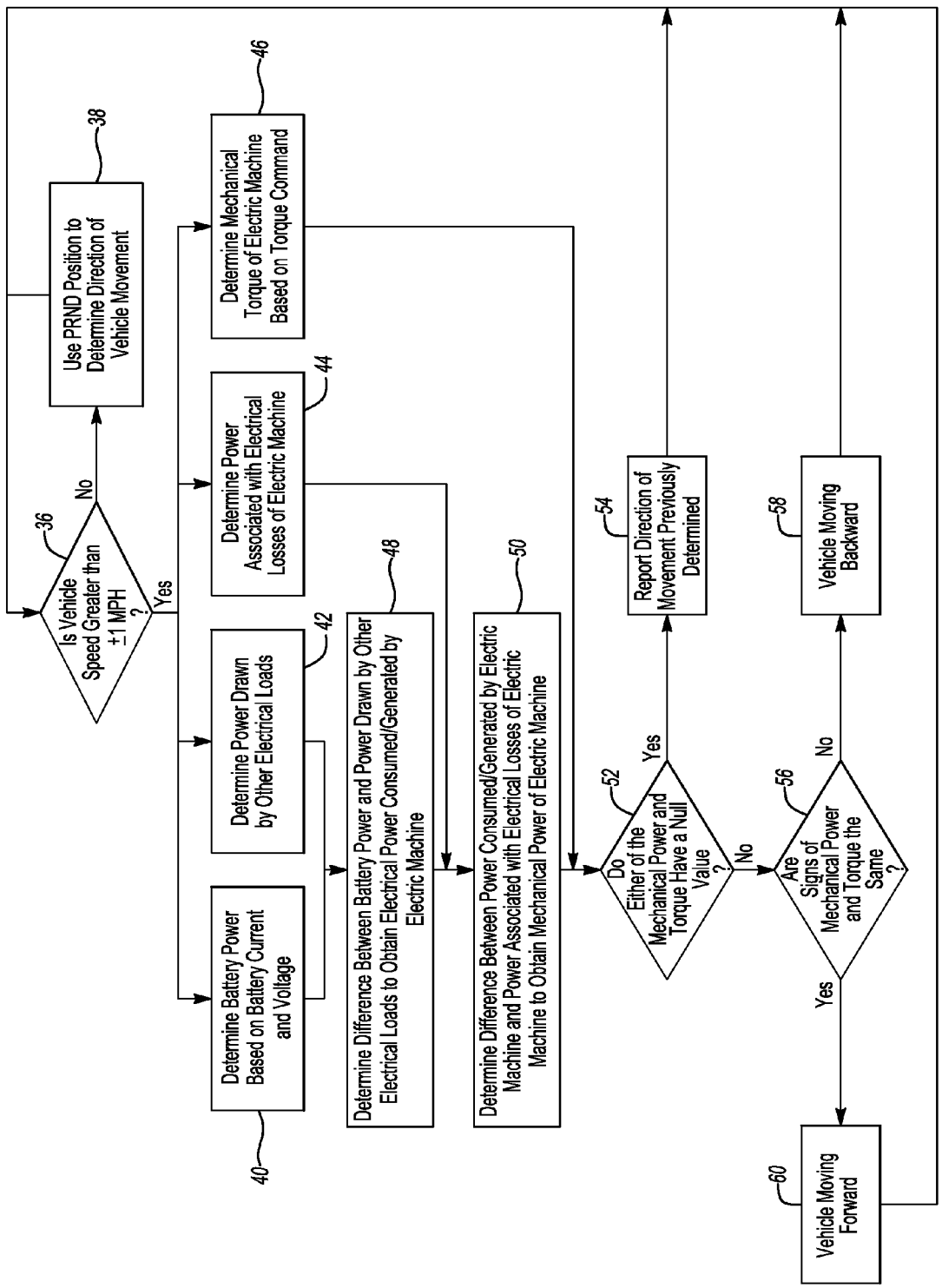
FIG. 2 is a flow chart depicting an example algorithm for determining a forward or backward movement of a vehicle.

Referring now to FIG. 2, it is determined whether vehicle speed is greater than ±1 mile per hour as indicated at 36. If no, the direction of vehicle movement is determined using a PRND position as indicated at 38. If yes, a battery power, power drawn by other electrical loads, power associated with electrical losses of an electric machine, and a mechanical torque of the electric machine may be determined (see discussion above) as indicated at 40, 42, 44, 46 respectively.

As indicated at 48, an electrical power consumed/generated by the electric machine may be obtained by determining a difference between the battery power, and power drawn by the other electrical loads.

As indicated at 50, a mechanical power of the electric machine may be obtained by determining a difference between the electrical power consumed/generated by the electric machine, and the power associated with electrical losses of the electric machine.

As indicated at 52, it is determined whether either of the mechanical power and torque have a null value. If yes, the direction of movement previously determined is reported as indicated at 54. If no, it is determined whether the signs of the mechanical power and torque are the same as indicated at 56. If no, the vehicle is determined to be moving backward as indicated at 58. If yes, the vehicle is determined to be moving forward as indicated at 60.

As apparent to those of ordinary skill, the algorithms, etc. disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms, etc. may also be implemented in a software executable object. Alternatively, the algorithms, etc. may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive vehicle comprising:
   a driveshaft;

an electric machine configured to generate and consume electrical power, wherein the electric machine includes a rotor connected with the driveshaft; and a controller programmed to determine a direction of rotation of the rotor based on (i) a torque command to the electric machine and (ii) the electrical power generated or consumed by the electric machine.

2. The vehicle of claim 1 wherein the direction of rotation of the rotor is indicative of forward or backward movement of the vehicle.

3. The vehicle of claim 1 wherein the controller is further programmed to determine the direction of rotation of the rotor if a speed of the vehicle is above a predetermined threshold.

4. The vehicle of claim 1 further comprising a power storage unit configured to provide electrical power to and receive electrical power from the electric machine.

5. The vehicle of claim 1 wherein the power storage unit is a traction battery.

6. An automotive vehicle comprising:

an electric machine configured to provide and receive mechanical torque; and a controller programmed to determine a forward or backward movement of the vehicle based on (i) the provided or received mechanical torque and (ii) a mechanical power of the electric machine.

7. The vehicle of claim 6 wherein the controller is further programmed to determine the forward or backward movement of the vehicle if a speed of the vehicle is above a predetermined threshold.

8. The vehicle of claim 6 further comprising a power storage unit arranged to provide electrical power to and receive electrical power from the electric machine, wherein the mechanical power of the electric machine is based on the provided or received electrical power.

9. The vehicle of claim 8 wherein the power storage unit is a traction battery.

10. The vehicle of claim 6 further comprising a driveshaft connected with the electric machine.

11. The vehicle of claim 10 wherein the electric machine includes a rotor, and wherein the forward movement of the vehicle is indicative of a first direction of rotation of the rotor, and the backward movement of the vehicle is indicative of a second direction of rotation of the rotor opposite the first.

* * * * *